United States Patent [19]
Borlinghaus et al.

[11] Patent Number: 5,967,471
[45] Date of Patent: Oct. 19, 1999

[54] VEHICLE PARALLEL SEAT LIFT WITH STABLE LINKAGE

[75] Inventors: Hans Juergen Borlinghaus; James Peter Nini, both of Clinton Township, Mich.

[73] Assignee: Lear Corporation, Southfield, Mich.

[21] Appl. No.: 08/992,472

[22] Filed: Dec. 17, 1997

[51] Int. Cl.$^6$ .................................................. F16M 11/00
[52] U.S. Cl. .......................... 248/157; 248/419; 248/420
[58] Field of Search ..................................... 248/157, 419, 248/420, 421, 422, 424, 429, 370, 132, 161, 393, 395, 396, 404, 416; 297/330, 344.17, 344.15; 74/110

[56] References Cited

U.S. PATENT DOCUMENTS

| | | | |
|---|---|---|---|
| 2,784,764 | 3/1957 | Rigby et al. .............................. | 155/14 |
| 2,875,809 | 3/1959 | Ragsdale et al. ......................... | 155/14 |
| 2,919,744 | 1/1960 | Tanaka ...................................... | 155/14 |
| 3,006,594 | 10/1961 | Gruendler ................................ | 248/424 |
| 3,066,907 | 12/1962 | Latimer et al. ........................... | 248/420 |
| 3,137,472 | 6/1964 | Louton, Jr. et al. ...................... | 248/371 |
| 3,182,947 | 5/1965 | Tanaka ..................................... | 248/421 |
| 3,410,515 | 11/1968 | Posh ........................................ | 248/394 |
| 4,015,812 | 4/1977 | Heesch .................................... | 248/394 |
| 4,344,594 | 8/1982 | Hirth ....................................... | 248/421 |
| 4,533,106 | 8/1985 | Stockl ...................................... | 248/421 |
| 4,756,576 | 7/1988 | Bianchi et al. ........................... | 297/325 |
| 4,949,585 | 8/1990 | Dauvegne et al. ...................... | 74/89.15 |
| 4,966,045 | 10/1990 | Harney ................................... | 74/424.8 |
| 5,046,697 | 9/1991 | Detloff et al. ........................... | 248/394 |
| 5,112,018 | 5/1992 | Wahls ...................................... | 248/394 |
| 5,222,402 | 6/1993 | White et al. ............................. | 74/89.14 |
| 5,321,617 | 6/1994 | Mori et al. ............................... | 364/424.05 |
| 5,349,878 | 9/1994 | White et al. ............................. | 74/89.14 |
| 5,456,439 | 10/1995 | Gauger .................................... | 248/429 |
| 5,472,165 | 12/1995 | Gruber .................................... | 248/424 |
| 5,586,740 | 12/1996 | Borlinghaus et al. .................. | 248/157 |

*Primary Examiner*—Leslie A. Braun
*Assistant Examiner*—Willie Berry, Jr.
*Attorney, Agent, or Firm*—Brooks & Kushman PC

[57] ABSTRACT

A parallel acting vehicle seat lift uses a single jack screw unit at the front and a passive linkage at the rear. The linkage is located such its inherent play or looseness is continually taken up by the constant weight force of the occupant acting downwardly at the rear of the seat cushion. The jack screw unit, which is inherently tight, is attached at the bottom to the vehicle floor and at the top to the seat cushion frame by close fitting pivots, so there is no perceptible looseness. The passively acting linkage uses two bell cranks, each centrally pivoted to the floor, the first of which is attached at one arm the seat cushion frame by a close fitting pivot. The second bell crank is attached to the rear of the seat cushion frame by a lost motion connection, and the two facing arms of the bell cranks are connected together by a second lost motion connection. The continually acting weight force of the seat occupant imposes opposed moments on the bell cranks about their central pivots, thereby taking the play out of the lost motion connections.

3 Claims, 4 Drawing Sheets

VEHICLE PARALLEL SEAT LIFT WITH STABLE LINKAGE

TECHNICAL FIELD

This invention relates to vehicle seat lifts in general, and specifically to a parallel seat lift with a powered lift at the front and a passive linkage at the rear which has a perceptibly solid feel.

BACKGROUND OF THE INVENTION

Most commercially available powered vehicle seat lifts provide for both vertical lifting and back and forth tilting of the seat cushion, as well as back and forth, lateral adjustment. These are typically referred to as six way adjusters, the six ways being up and down, back and forth tilt, and back and forth lateral adjustment. An example may be seen in co assigned U.S. Pat. No. 4,664,351 to Borlinghaus. Powered jack screw units beneath the front and back of the seat cushion frame are rigidly attached at their lower ends to a floor plate, and attached at their upper ends to the seat cushion frame through a so called lost motion pivot, consisting of a pin that moves in a substantially horizontal slot. The pins and slots allow vertical lift to be applied to the seat cushion frame as well as allowing the ends of the frame to swing in an arc having a horizontal component. The same allowance for compound motion can be provided through the use of an additional transfer link or links between the end of the jack screw and the seat cushion frame. Less common, though known, are parallel acting seat lift mechanisms, which remain substantially parallel to their previous positions as they are raised or lowered, but lack the ability to tilt back and forth independently. An example may be seen in co assigned U.S. Pat. No. 2,919,744 to Tanaka. Even with a parallel lift, allowance must be made for some horizontal motion concurrent with the vertical, through pin and slot connections or extra links. An inherent problem with any lift mechanism that uses pin and slot connections or extra links, especially when located beneath the front of the seat cushion frame, is that a rocking motion by the seat occupant can cause a perceptible up and down motion of the seat cushion frame, sometimes referred to as seat chuck. While the basic operation of the seat is not affected, a perceptible motion of the seat is thought to be undesirable in terms of quality, or at least the perception of quality. However, there was previously no known means of providing for the necessary compound motion of the seat frame without the kinds of lost motion connections that were inherently loose.

Recently, a seat lift design disclosed in co assigned U.S. Pat. No. 5,586,740 has provided a six way seat adjuster without the need for the lost motion connections. Powered jack screw units beneath the front and rear of the seat cushion frame have close fitting pivots at both the upper end, where they attach to the seat cushion frame, and the lower end, where they attach to the floor pan. In order to provide stability, a brace located between the two jack screw units is closely pivoted to both the floor pan and the seat cushion frame, running diagonally. Having only close fitting pivots, and no pin and slot connections or extra links, the seat cushion frame is able to move up, down, or tilt back and forth with essentially no perceptible play or chuck. A variation of the design is disclosed in co pending and co assigned application Ser. No. 08/548,892, filed Oct. 26, 1995. This design replaces the rear jack screw unit, which is essentially vertical, with a nearly horizontal jack screw unit, the moving end of which is pivoted to the seat cushion frame through an intermediate, single bell crank that is also centrally pivoted to the floor pan. The single bell crank acts both as a force transferring connection to the seat cushion frame, and as a stabilizing brace. As with the design in U.S. Pat. No. 5,586,740, the absence of pin-slot connections or multiple link connections provides a solid occupant feel with substantially imperceptible response of the seat cushion frame to a rocking motion. Both designs, however, require two jack screw units, and their attendant motors, drive shafts and transmissions, which are costly.

SUMMARY OF THE INVENTION

The subject invention provides a parallel acting lift mechanism which uses only a single jack screw unit beneath the front of the seat, in conjunction with a passive, unpowered lift linkage beneath the rear of the seat. Although it incorporates multiple links and a pair of lost motion connections, the passive lift linkage takes advantage of the way in which the seat cushion frame is loaded to prevent perceptible play in the system.

In the preferred embodiment disclosed, each side of the front of the seat cushion frame is supported on a jack screw unit, which is closely pivoted at the lower end to the floor pan, and closely pivoted at the upper end to the seat cushion frame. The jack screw unit inherently is subject to only imperceptible play along its axis as it expands and contracts to raise and lower the front of the seat frame. The rear of the seat cushion frame is supported on a passive rear lift linkage that uses two bell cranks. A first, front bell crank is closely pivoted at its center to the floor pan, and closely pivoted at a front arm to the seat cushion frame. A second, rear bell crank is closely pivoted at its center to the floor pan, and connected at a rear arm to the rear of the seat cushion frame through a pin and elongated slot. The facing rear and front arms of the front and rear bell cranks are themselves connected together by an extra transfer link.

When the front jack screw unit expands or contracts, the passive linkage follows suit, in effect, raising and lowering the rear of the seat cushion frame. The seat cushion frame as a unit moves up and down parallel to its previous positions. Whether the seat cushion frame is moving or stationary, the front of the frame is inherently free of perceptible up and down motion. The passive linkage, on the other hand, has two lost motion type connections that are inherently subject to play. However, the nature of the occupant's position in the seat, puts a large downward force on the rear of the seat, just under the hips, regardless of whether the occupant is sitting still or rocking back and forth. That continual downward force acts, through the seat cushion frame, to impose continual, opposing moments on the two bell cranks about their central pivots. The opposing moments, in turn, continually keep the two lost motion pivot connections in a settled and stable condition, so that there is also essentially no perceptible up and down motion in the rear of the seat, either.

BRIEF DESCRIPTION OF THE DRAWINGS

These and other features of the invention will appear from the following written description and from the drawings, in which.

DESCRIPTION OF THE PREFERRED EMBODIMENT

Figure 1:
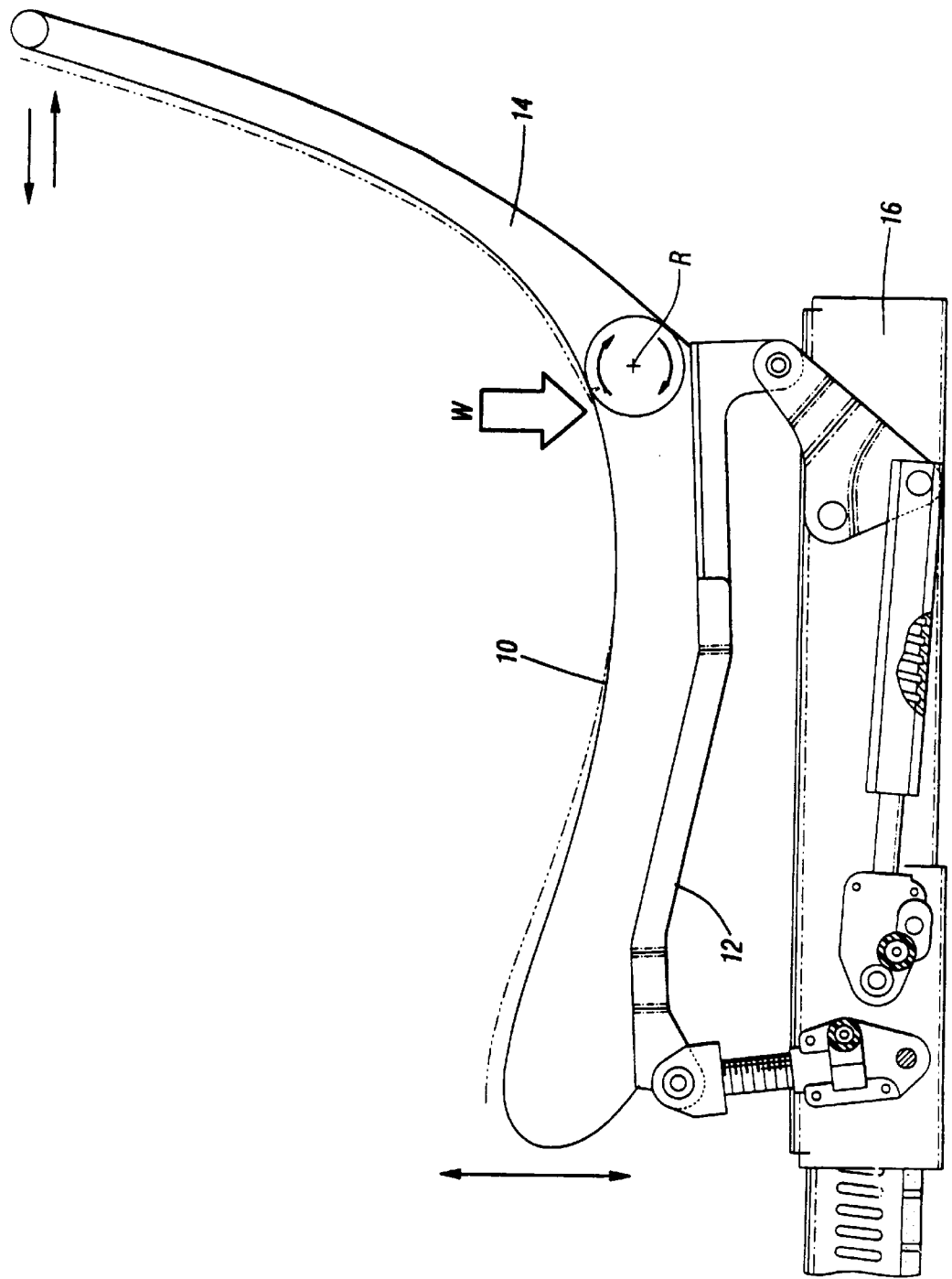
FIG. 1 is a view of a seat, including seat cushion frame and seat back, showing the various occupant forces to which a seat is subject.

Referring first to FIG. 1, the effect of occupant forces on a seat in general is illustrated. A seat cushion 10 is supported on a seat cushion frame, represented by one frame rail 12. There would be a frame rail 12 on each side, of course, as well as other structure interconnecting them to complete the seat cushion frame, but the illustration of one frame rail 12 is sufficient. A seat back 14 is attached to the seat cushion frame at a recliner axis R. The seat cushion frame rail 12 is supported on a floor pan 16, one side of which is shown, which can be adjusted back and forth relative to the non-illustrated vehicle floor. However, for all intents and purposes, the floor pan 16 can be considered the same as the vehicle floor, since its fore and aft motion is provided by a standard adjuster, and not relevant to the invention. The seat cushion 10 is supported on the floor pan 16 (and floor) by a powered lift mechanism which, as shown, is similar to that disclosed in the co-pending patent application referred to above. This is merely illustrative, however, as any seat cushion 10 will be supported beneath the front and rear by some lift mechanism, which will experience all the loads that the seat cushion 10 experiences. The general orientation of a seat occupant is illustrated by the dotted line running along cushion 10 and seat back 14. The nature of the occupant's anatomy is such that a constant, large downward weight force W always presses on the rear of the seat cushion 10 and frame rail 12. This is true so long as the occupant is present, whether the occupant is stationary or moving, and whether the seat cushion 10 is stationary or moving up and down. The occupant may rock back and forth, moving knees up and down, or pushing back and forth into the seat back 14 and against the shoulder belt, as illustrated by the arrows at the front of seat cushion 10 and at the top of seat back 14. These rocking forces create a moment about axis R, and may jiggle the frame rail 12 up and down perceptibly, if the lift mechanism that supports the rail 12 on floor pan 16 has sufficient inherent play or looseness. Research has shown that as little as five thousandths of an inch of play or looseness in the lift mechanism can be perceived by an occupant. Again, it should be kept in mind that even a rocking or fidgeting occupant continues to apply the downward force W just below the hips, a fact that the subject invention uses to advantage.

Figure 2:
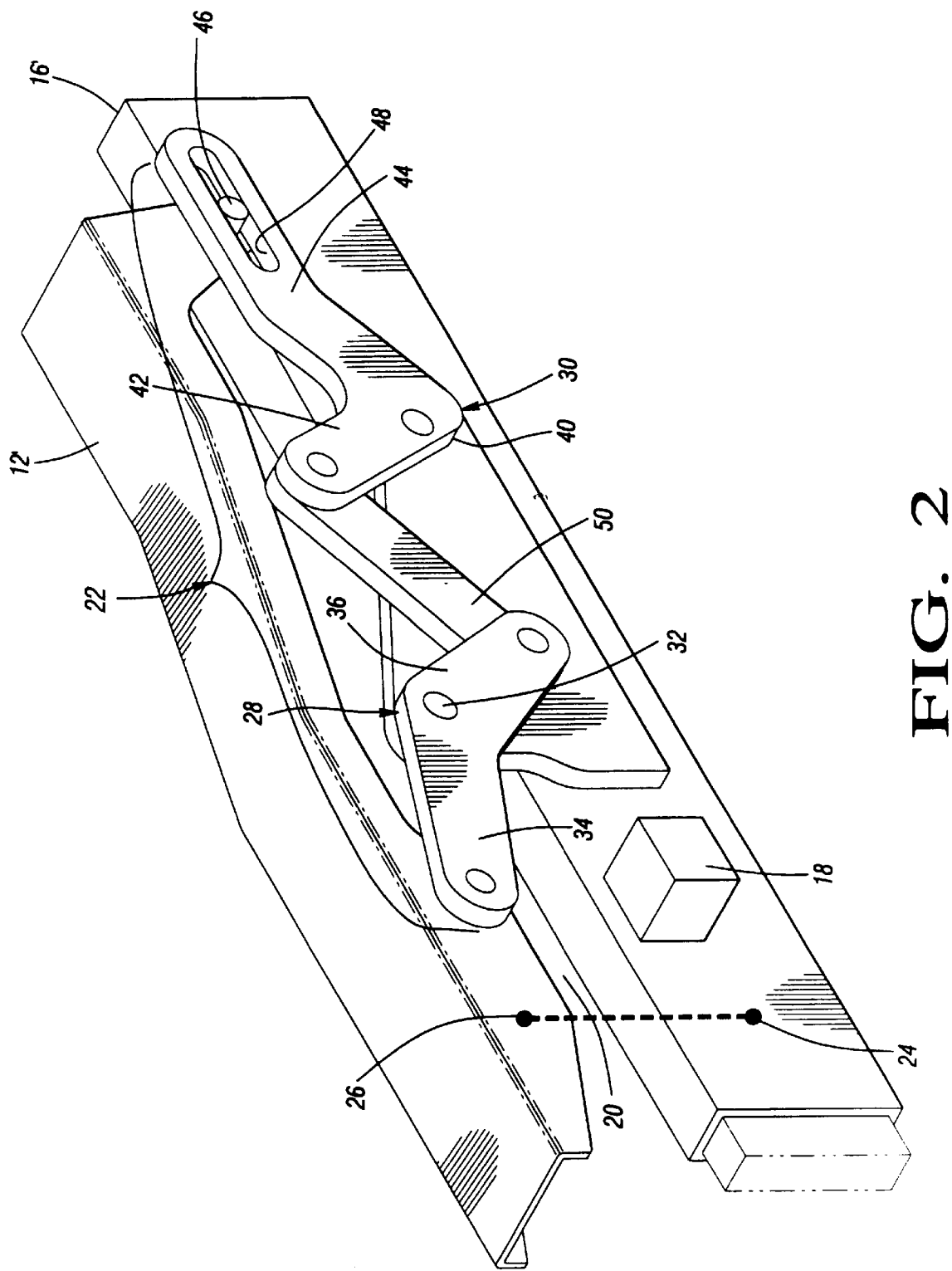
FIG. 2 is a perspective view of the right hand side of a floor pan and seat cushion frame showing just the passive rear lift linkage.
Figure 3:
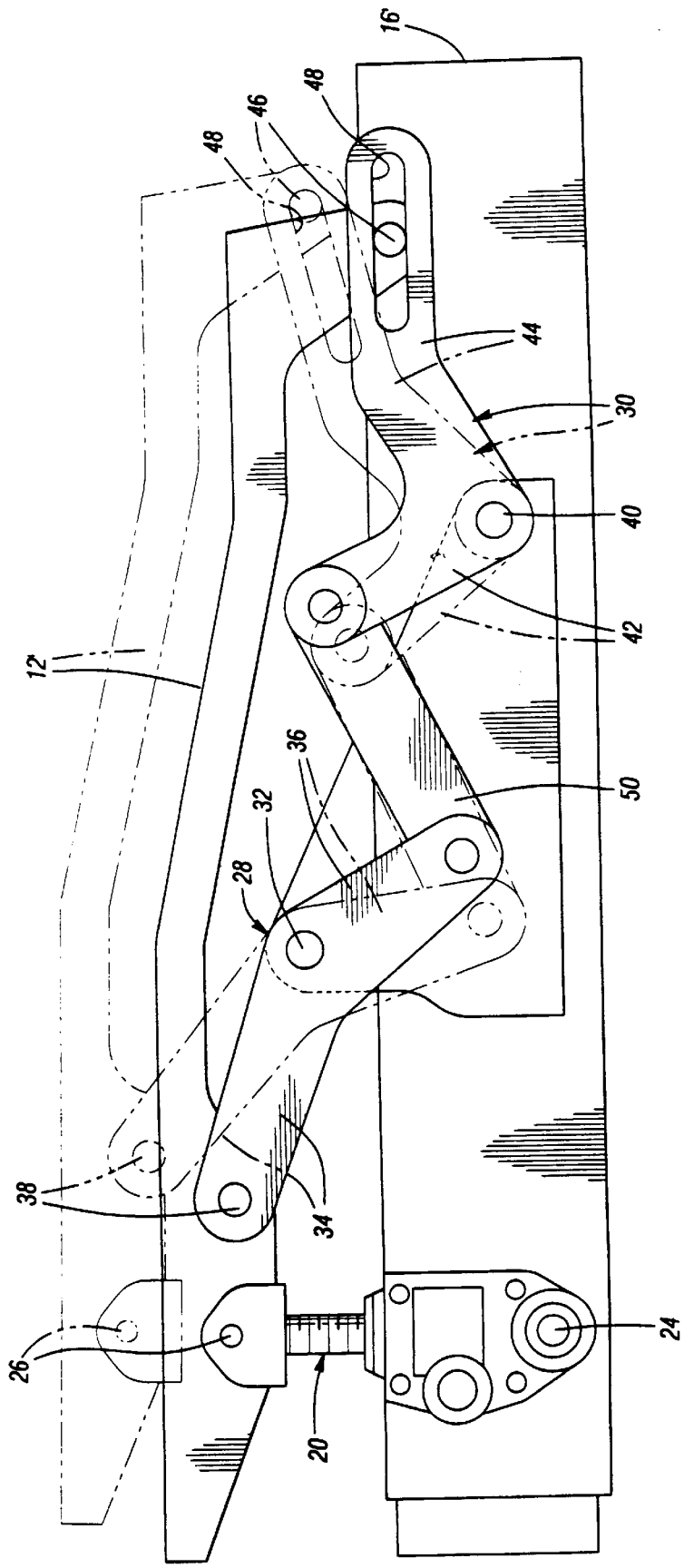
FIG. 3 a side view of one side of a floor pan and seat cushion frame, showing both the powered front lift and the passive rear lift linkage, and showing two possible vertical positions of the seat cushion frame, a lowered position in solid and a raised position in dotted lines.

Referring next to FIGS. 2 and 3, the subject invention supports the same type of seat cushion frame rail on the same type of floor pan, which are indicated by the same numbers primed. The floor pan 16' can also be moved back and forth by conventional adjuster, which would reside in the area generally indicated at 18. However, the floor pan 16' and vehicle floor can conveniently be considered one and the same, since the floor pan 16' will be stationary whenever the lift mechanism is at work. The lift mechanism consists of two basic, cooperating subsystems, a powered jack screw unit at the front, indicated generally at 20, and a passive rear lift linkage indicated generally at 22. The powered jack screw unit 20 expands or contracts along its axis, shown by a dotted line, when turned by a conventional motor and transmission, not illustrated. Only the axis of unit 20 is shown in FIG. 2. Two units like 20 would be used, one under the front end of each seat cushion frame rail 12', generally driven by a common motor, transmission and split shaft. The lower end of each unit 20 is connected to the floor pan 16' by a close fitting pivot 24, and the upper end is connected to the front of frame rail 12' by a close fitting pivot 26. By close fitting pivot, it is meant that a pin is journaled in a like sized opening with just enough clearance to allow free turning, but not enough to allow any perceptible looseness or play. The jack screw unit 20 is inherently tight and solid as it expands and contracts, with only one to two thousandths of an inch play, which is not perceptible. As it expands, it lifts the front of frame rail 12', and moves over a shallow arc about the lower pivot 24, as allowed by the upper pivot 26. The jack screw unit 20 has a total axial travel of approximately an inch and a half, less than two inches in most cases. Since it departs only slightly from vertical as it pivots, the unit 20 imparts essentially the same degree of lift to the front of seat frame rails 12'. As such, the front jack screw unit 20 works essentially the same as it does in the co assigned patent and patent application referred to above. The difference is that only one jack screw unit like 20 is used, with an attendant cost saving. The less expensive linkage 22 is used for rear lift, and while it can not provide independent seat cushion tilt, it provides a passive, parallel lift that is, so far as can be perceived, very solid.

Still referring to FIGS. 2 and 3, the details of the rear lift linkage 22 are illustrated. In general, linkage 22 works in conjunction with the front jack screw unit 20, providing a passive lift to the rear of rail 12' matching the front lift of the unit 20. Only one powered lift is needed, although the rail 12' consequently has only the ability to raise or lower in parallel fashion, without independent front and rear tilt. However, the cost and space savings are worth that limitation, provided a solid feel can be provided. Linkage 22 consists of two basic components, a first bell crank, indicated generally at 28, and a second bell crank, indicated generally at 30. The two bell cranks 28 and 30 are connected to the rails 12', and to each other, in an orientation that provides parallel lift along with the desired solid feel. First bell crank 28 has a close fitting central pivot to the floor pan 16', about which a front arm 34 and a rear arm 36 swing in opposite directions. The end of front arm 34 is connected to rail 12' at a close fitting pivot 38 just behind the jack screw upper pivot 26. The second bell crank 30 has a close fitting central pivot 40 to the floor pan 16', located below and behind the other central pivot 32, about which a front arm 42 and rear arm 44 swing in opposite directions. The end of rear arm 44 is connected to the rear of frame rail 12' by a pin 46 (fixed to rail 12') which rides in an elongated slot 48 in the end of rear arm 44. (The pin and slot could be reversed) The two facing arms, 36 and 42, are pivoted together indirectly through a transfer link 50. As jack screw unit 20 raises the front of rail 12', first bell crank front arm 34 swings up and its rear arm 36 swings down. In response, link 50 is pulled down, and the second bell crank front arm 42 is swung down as its rear arm 44 is swung up. At the front end of rail 12', close fitting pivot 38 moves up and back in an arc which has vertical and horizontal components V and H. At the rear end of rail 12', the pin 46 is moved by the second bell crank rear arm 44 in an arc matching that of pivot 38. Although the end of arm 44 moves in a different arc, the necessary motion of pin 46 is allowed for by the clearance in the elongated slot 48, the so called "lost motion" connection, without which the linkage 22 would bind. Simultaneously, the divergence of the arcs of motion of the ends of the two facing bell crank arms 36 and 42 is compensated by the transfer link 50, another lost motion interconnection. The net effect on the frame rail 12' is that it swings up and back in parallel fashion. When the jack screw unit 20 is contracted, the linkage 22 reverses its motion, and rail 12' swings down and forward to the same degree and in the same way. Linkage 22 has inherent looseness, unlike unit 20, because of the pin 46 and slot 48 and the extra link 50, without which it would bind. However, the location of the linkage 22 takes advantage of the way in which the seat cushion 10 is continually loaded to create an impression of solidity, as is described in detail next.

Figure 4:
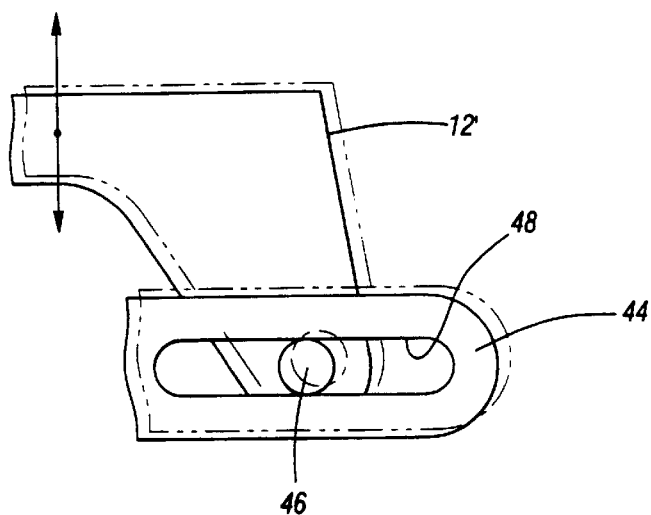
FIG. 4 is a side view of just the lost motion connection between the rear bell crank the seat cushion frame.
Figure 5:
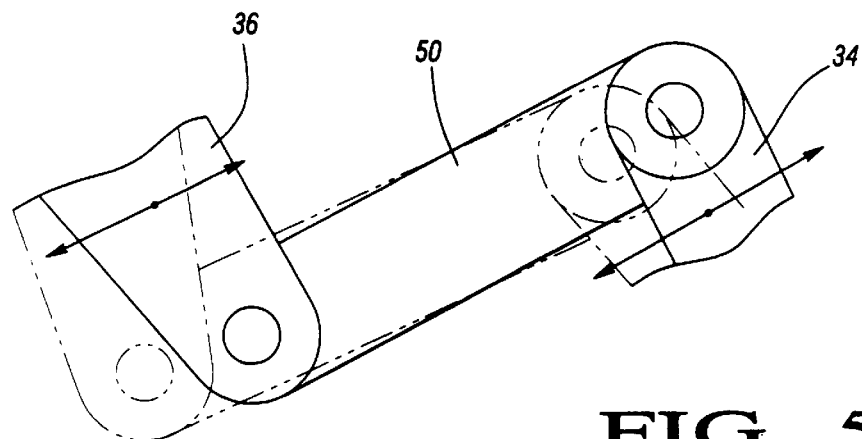
FIG. 5 is a side view of just the lost motion connection between the two bell cranks.
Figure 6:
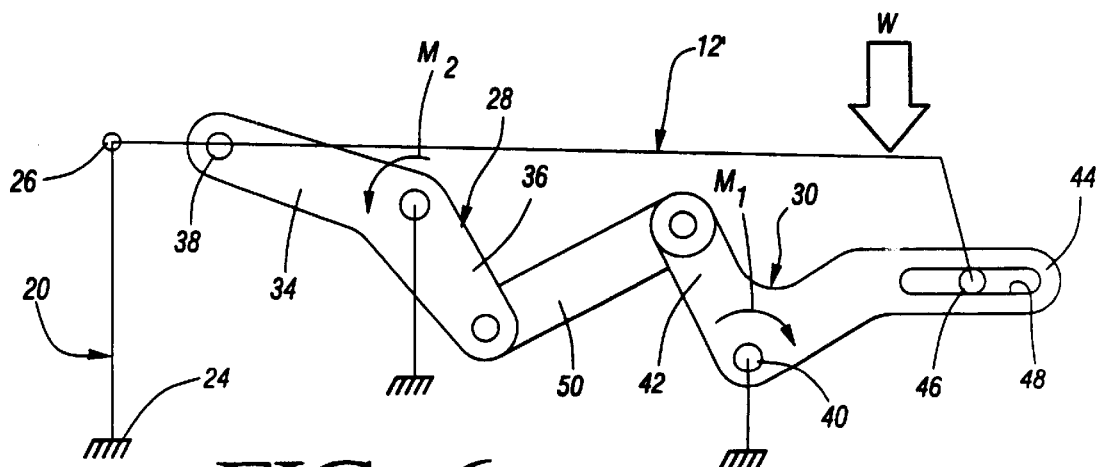
FIG. 6 is a schematic view showing the net effect of the occupant weight force on the seat cushion frame and on the passive rear lift linkage.

Referring next to FIGS. 4 through 6, the inevitable play in linkage 22 is illustrated, as well as the means by which it is taken up. As seen in FIG. 4, the pin 46 is able to easily slide in slot 48, so that the end of rail 12' is also able to move up and down perceptibly if subjected to up and down force, shown by the arrows. Likewise, as seen in FIG. 5, the extra link 50 is able to easily twist back and forth if the ends of the two facing bell crank arms that it connects, 36 and 42, are subjected to back and forth forces, also indicated by arrows. The orientation of the components of linkage 22, and the way they are attached to the rail 12' and floor pan 16', act to keep linkage 22 in a perceptively solid condition. FIG. 6 schematically shows the frame rail 12', floor pan 16', and jack screw unit 20 as simply lines and pivot points to better illustrate the reaction of the elements of linkage 22. The large, continual weight force W of the occupant tends to continually pivot the frame rail 12' down about the jack screw unit upper pivot 26, even though the frame rail 12' stops pivoting and reaches a stable equilibrium whenever the jack screw unit 20 is stationary. The end of frame rail 12' continually pushes down on the pin 46 and on the bottom edge of slot 48 in the second bell crank rear arm 44, thereby creating a continual moment M1 on the second bell crank 30 about its central pivot 40, clockwise from the perspective of FIG. 6. At the same time, the occupant weight force W on frame rail 12' pushes down on the first bell crank front arm at pivot 38, although not as directly as at pin 46, and thereby creates a continual moment M2 on first bell crank 28 about its central pivot 32 in the opposite direction. The continual force down on pin 46 and the bottom edge of slot 48 keeps the two settled out at the solid line position shown in FIG. 4. The constant, opposed moments on the two bell cranks 28 and 30 maintain the intermediate link 50 twisted into the solid line position shown in FIG. 5. Therefore, so long as the seat is occupied, the weight force W is acting, and there is a perceived solidity at both the front and rear of the frame rail 12'. When the seat is unoccupied, there would be perceptible looseness at the rear of the frame rail 12', of course, but with no one present to actually perceive it, it would be irrelevant. On the other hand, the presence of pin and slot connections, extra compensating links, or inherently loose sector gears below the front of seat rail 12', as found in essentially all seat lift designs except the co assigned recent patent and patent application referred to above, would create perceptible looseness or play even when the seat was occupied.

In conclusion, a parallel acting seat lift with an effectively solid feel is obtained using a power lift only at the front. Furthermore, the elements of the linkage 22, being flat and packaged against the side of the floor pan 16', are compact and leave extra room beneath the seat cushion 10, as compared to a second powered unit with its accompanying motors, drive shafts, transmissions and wiring harnesses. Variations in the disclosed embodiment could be made. In a very simple system, or in a rear seat where fore and aft seat adjustment was not needed, the lower end of the jack screw unit 20 and the bell crank central pivots 32 and 40 could be pivoted directly to the vehicle floor, rather than to a movable floor pan 16'. Other powered lifts beneath the front of frame rail 12' could be used, so long as they were closely pivoted at top and bottom and were axially expandable and contractible with inherently imperceptible axial play or looseness. The two bell cranks 28 and 30 could be connected together by a pin and elongated slot rather than the extra link 50. Likewise, the second bell crank ream arm 44 could be connected to the back end of frame rail 12' by an extra link, rather than the pin 46 and slot 48. A shorter linkage 22 could be used, that is, one in which all the constituent links and cranks were shorter and the forwardmost pivot 38 was not as close to the jack screw upper pivot 26. Therefore, it will be understood that it is not intended to limit the invention to just the embodiment disclosed.

We claim:

1. In a vehicle seat having a seat cushion frame supported on a vehicle floor and supporting an occupant who creates a continual downward weight force near the back of said seat cushion frame as well as an intermittent rocking motion that tends to move said seat cushion frame up and down, a lift mechanism for raising and lowering said seat cushion frame in parallel fashion while preventing perceptible up and down motion of said seat cushion frame, said lift mechanism comprising;

an axially expandable and contractible powered front lift located beneath said seat cushion frame, said front lift having a substantially imperceptible axial play as it expands and contracts, with a lower end pivoted closely to the vehicle floor and an upper end pivoted closely to the front of said seat cushion frame, so that said powered front lift raises and lowers the front of said seat frame as it expands and contracts, also without perceptible axial play, a passive rear lift linkage located beneath said seat cushion frame, said rear lift linkage having a first bell crank located behind said power front lift/and having a first central pivot fixed to said vehicle floor, a front arm pivoted to said seat cushion frame at a close fitting pivot located behind said powered front lift, and a rear arm that moves oppositely to said front arm about said first central pivot, a second bell crank located behind said first bell crank and having a second central pivot fixed to said vehicle floor, a front arm and a rear arm that moves oppositely of said front arm about said second central pivot, said second bell crank rear arm being connected to the rear of said seat cushion frame through a lost motion pivot, and said first bell crank rear arm and said second bell crank front arm being connected together through an intermediate transfer link, whereby, axial expansion or contraction of said powered front lift directly raises or lowers the front of said seat cushion frame, which is translated into concurrent, matching rear lift of said seat cushion frame through said passive rear lift linkage, with said rear lift linkage being continually maintained in a settled, stable condition, both when said seat cushion is being raised and lowered and when seat cushion frame is subjected to rocking motion, by the continual downward weight force acting at the rear of said seat cushion frame, which applies continual, opposing moments to both said front and rear bell cranks about their respective central pivots, thereby continually preventing play in both said lost motion pivot an said intermediate transfer link.

2. In a vehicle seat having a seat cushion frame supported on a vehicle floor and supporting an occupant who creates a continual downward weight force near the back of said seat cushion frame as well as an intermittent rocking motion that tends to move said seat cushion frame up and down, a lift mechanism for raising and lowering said seat cushion frame parallel fashion while preventing perceptible up and down motion of said seat cushion frame, said lift mechanism comprising;

a substantially vertically oriented jack screw unit located beneath said seat cushion frame, with a lower end pivoted closely to the vehicle floor and an upper end pivoted closely to the front of said seat cushion frame, so as to raise and lowers the front of said seat frame as it expands and contracts without perceptible axial play, a passive rear lift linkage located beneath said seat cushion frame, said rear lift linkage having a first bell crank located behind said jack screw unit and having a first central pivot fixed to said vehicle floor, a front arm pivoted to said seat cushion frame at a close fitting pivot located behind said jack screw unit, and a rear arm that moves oppositely to said front arm about said first central pivot, a second bell crank located behind said first bell crank and having a second central pivot fixed to said vehicle floor, a front arm and a rear arm that moves oppositely of said front arm about said second central pivot, said second bell crank rear arm being connected to the rear of said seat cushion frame through a lost motion pivot, and said first bell crank rear arm and said second bell crank front arm being connected together through an intermediate transfer link, whereby, axial expansion or contraction of said jack screw unit directly raises or lowers the front of said seat cushion frame, which is translated into concurrent, matching rear lift of said seat cushion frame through said passive rear lift linkage, with said rear lift linkage being continually maintained in a settled, stable condition, both when said seat cushion is being raised and lowered and when seat cushion frame is subjected to rocking motion, by the continual downward weight force acting at the rear of said seat cushion frame, which applies continual, opposing moments to both said front and rear bell cranks about their respective central pivots, thereby continually preventing play in both said lost motion pivot and said intermediate transfer link.

3. In a vehicle seat having a seat cushion frame supported on a vehicle floor and supporting an occupant who creates a continual downward weight force near the back of said seat cushion frame as well as an intermittent rocking motion that tends to move said seat cushion frame up and down, a lift mechanism for raising and lowering said seat cushion frame in parallel fashion while preventing perceptible up and down motion of said seat cushion frame, said lift mechanism comprising;

a substantially vertically oriented jack screw unit located beneath said seat cushion frame, with a lower end pivoted closely to the vehicle floor and an upper end pivoted closely to the front of said seat cushion frame, so as to raise and lowers the front of said seat frame as it expands and contracts without perceptible axial play, a passive rear lift linkage located beneath said seat cushion frame, said rear lift linkage having a first bell crank located behind said jack screw unit and having a first central pivot fixed to said vehicle floor, a front arm pivoted to said seat cushion frame at a close fitting pivot located behind said jack screw unit, and a rear arm that moves oppositely to said front arm about said first central pivot, a second bell crank located behind said first bell crank and having a second central pivot fixed to said vehicle floor, a front arm and a rear arm that moves oppositely of said front arm about said second central pivot, said second bell crank rear arm being connected to the rear of said seat cushion frame through a pin and elongated slot, and said first bell crank rear arm and said second bell crank front arm being connected together through an intermediate transfer link, whereby, axial expansion or contraction of said jack screw unit directly raises or lowers the front of said seat cushion frame, which is translated into concurrent, matching rear lift of said seat cushion frame through said passive rear lift linkage, with said rear lift linkage being continually maintained in a settled, stable condition, both when said seat cushion is being raised and lowered and when seat cushion frame is subjected to rocking motion, by the continual downward weight force acting at the rear of said seat cushion frame, which applies continual, opposing moments to both said front and rear bell cranks about their respective central pivots, thereby continually preventing play in both said pin and elongated slot and in said transfer link.

* * * * *